(12) United States Patent
Smith

(10) Patent No.: US 7,400,456 B2
(45) Date of Patent: Jul. 15, 2008

(54) LENS HAVING SEAMLESS PROFILE DEFINED BY CUBIC POLYNOMIAL FUNCTION

(75) Inventor: George Edward Smith, Sunnyvale, CA (US)

(73) Assignee: Avago Technologies ECBU IP Pte Ltd, Singapore (SG)

(*) Notice: Subject to any disclaimer, the term of this patent is extended or adjusted under 35 U.S.C. 154(b) by 0 days.

(21) Appl. No.: 10/945,660

(22) Filed: Sep. 21, 2004

(65) Prior Publication Data

US 2006/0061878 A1 Mar. 23, 2006

(51) Int. Cl.
- G02B 27/10 (2006.01)
- G02B 13/18 (2006.01)
- G02B 3/02 (2006.01)
- G02B 9/00 (2006.01)
- G02B 9/08 (2006.01)

(52) U.S. Cl. ........................... 359/708; 359/626

(58) Field of Classification Search ......... 359/708–710, 359/619, 620, 626
See application file for complete search history.

(56) References Cited

U.S. PATENT DOCUMENTS

| | | | |
|---|---|---|---|
| 3,768,888 A * | 10/1973 | Nishino et al. | 359/576 |
| 4,421,398 A | 12/1983 | Suzuki et al. | |
| 5,270,825 A * | 12/1993 | Takasugi et al. | 359/708 |
| 5,400,114 A | 3/1995 | Yoshida et al. | |
| 6,021,005 A * | 2/2000 | Cathey et al. | 359/737 |
| 6,115,181 A | 9/2000 | Kelly | |
| 6,212,012 B1 | 4/2001 | Tanaka | |
| 6,241,355 B1 * | 6/2001 | Barsky | 351/177 |
| 6,552,760 B1 | 4/2003 | Gotoh et al. | |
| 6,717,735 B2 | 4/2004 | Smith | |
| 6,842,297 B2 * | 1/2005 | Dowski, Jr. | 359/724 |
| 2003/0072083 A1 | 4/2003 | Smith | |
| 2004/0228005 A1 * | 11/2004 | Dowski, Jr. | 359/671 |

FOREIGN PATENT DOCUMENTS

WO WO/03/016963 2/2003

OTHER PUBLICATIONS

Vogl, T.P. et al, Asymetric Lens Design Using Bicubic Splines: Application to the Color TV Lighthouse; Nov. 1971; vol. 10, No. 11; Applied Optics.*

* cited by examiner

Primary Examiner—Alicia M Harrington

(57) ABSTRACT

A lens includes a surface that includes a seamless profile. The seamless profile is defined by at least one cubic polynomial function to provide a filtering surface that produces a controlled amount of spherical aberration.

13 Claims, 7 Drawing Sheets

LENS HAVING SEAMLESS PROFILE DEFINED BY CUBIC POLYNOMIAL FUNCTION

BACKGROUND

Lenses typically have two shaped surfaces that concentrate or disperse electromagnetic waves, such as light. Each lens refracts (or bends) electromagnetic waves that pass through the lens, similar to the way a prism refracts light. Each lens is made out of an optically transparent or translucent material, such as glass or plastic. The refractive index of the lens material and curvature of the shaped surfaces define the refraction of the electromagnetic waves.

Lenses can be found in a broad range of applications including illumination optics and imaging optics. In illumination optics, a lens confines or directs light from a light source into a beam to direct the light into an intended area of illumination. For example, a lens can direct light from an office ceiling lamp in a cubicle to the work area in the cubicle, and not other work areas in other cubicles.

In imaging optics, a lens confines or directs light from an object image to the focal plane of the lens. The light in the focal plane of the lens can be captured on film or with an electronic imaging sensor, such as a charge coupled device (CCD) or complementary metal oxide semiconductor (CMOS) imaging device.

Digital imaging systems, such as digital picture cameras, digital video cameras, and optical navigation mice, are sampled data systems. These sampled data systems include one or more lenses and one or more electronic imaging sensors for capturing an object image. The electronic imaging sensors include photo detectors that sample the object image. If spatial frequencies in the object image are greater than half the spatial sampling frequency of the electronic imaging sensor, the spatial frequency information exceeds the Nyquist frequency for the digital imaging system and aliasing errors can occur. For example, the electronic imaging sensor may sample the object image at a sample rate of 100 samples per millimeter (mm). If spatial frequencies in the object image are greater than 50 samples per mm, the spatial frequency information exceeds the Nyquist frequency for the digital imaging system and aliasing errors can occur.

Lenses are typically not perfect. Each lens includes aberrations that reduce the sharpness of images viewed through the lens. As a result, each lens operates as a low pass filter that reduces the magnitude of high spatial frequency information passing through the lens, where high spatial frequency information corresponds to fine image detail and a sharper image. The spatial frequency response of a lens is referred to as the lens' modulation transfer function (MTF), which is the contrast at a given spatial frequency relative to the contrast at other spatial frequencies. Lenses in digital imaging systems that pass high spatial frequency information contribute to aliasing errors in the digital imaging system.

One type of anti-aliasing filter includes birefringent material, such as crystalline structures. The birefringent material refracts light in two directions to blur the object image and filter high spatial frequency information. However, anti-aliasing filters that include birefringent material can be expensive.

For these and other reasons there is a need for the present invention.

SUMMARY

One aspect of the present invention provides a lens comprising a surface that includes a seamless profile. The seamless profile is defined by at least one cubic polynomial function to provide a filtering surface that produces a controlled amount of spherical aberration.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
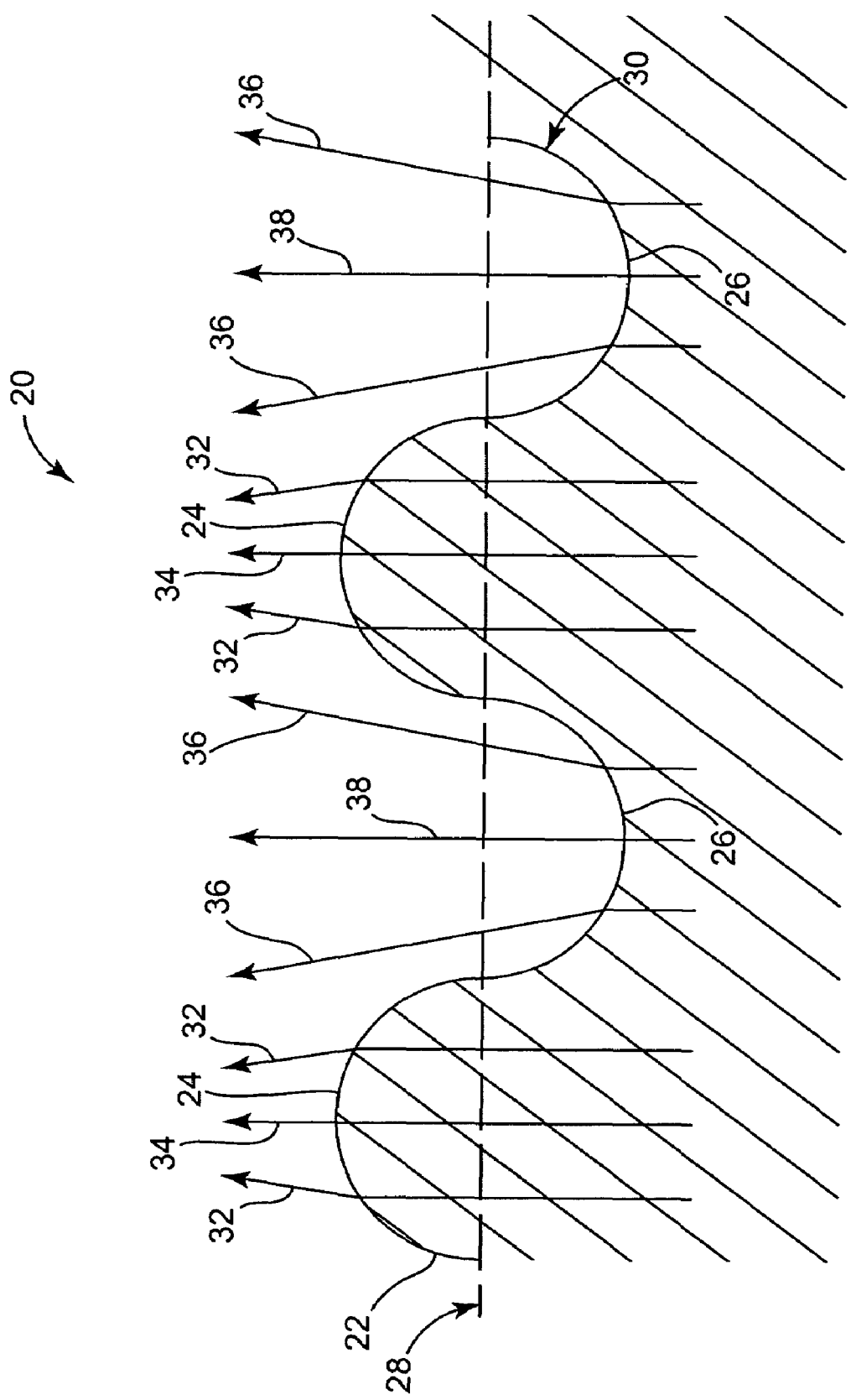
FIG. 1 is a diagram illustrating one embodiment of a lens structure.

FIG. 1 is a diagram illustrating one embodiment of a lens structure 20. Lens structure 20 includes a surface 22 that includes convex elements 24 and concave elements 26. The convex elements 24 and concave elements 26 are sag perturbations from an imaginary smooth surface, indicated at 28. Each of the convex elements 24 includes a positive surface curvature area relative to the smooth surface 28. Each of the concave elements 26 includes a negative surface curvature area relative to the smooth surface 28. Lens structure 20 refracts electromagnetic waves based on the slopes of convex elements 24 and concave elements 26.

Lens structure 20 can be part of a lens that refracts electromagnetic waves to provide a controlled amount of fuzziness or spherical aberration in the focal plane of the lens. With the controlled amount of fuzziness or spherical aberration, the lens operates as a low pass filter that passes low spatial frequency information. High spatial frequency information is stopped by the stop band of the lens.

In one embodiment, the shape of surface 22 is defined by at least one cubic polynomial function to provide a filtering surface that produces a controlled amount of spherical aberration. The controlled amount of spherical aberration produces a low pass filter with an improved stop band. In one embodiment of an imaging system, the lens operates as a low pass filter that has an improved stop band to stop high frequency spatial information that exceeds the Nyquist frequency of the imaging system. The lens reduces aliasing in the imaging system and artifacts in the resulting image.

Surface 22 includes a seamless profile 30. The seamless profile 30 is continuous and has a defined slope at each point of surface 22. Seamless profile 30 does not include discontinuities, such as cusps.

Lens structure 20 refracts electromagnetic waves based on the lens material of the lens structure 20 and the slopes of convex elements 24 and concave elements 26. Each of the convex elements 24 refracts electromagnetic waves, indicated at 32, toward the optical axis 34 of the convex element 24. Each of the concave elements 26 refracts electromagnetic waves, indicated at 36, away from the optical axis 38 of the concave element 26. In one embodiment, lens structure 20 is made of plastic. In one embodiment, lens structure 20 is made of glass. In other embodiments, lens structure 20 can be made of any suitable material.

Figure 2:
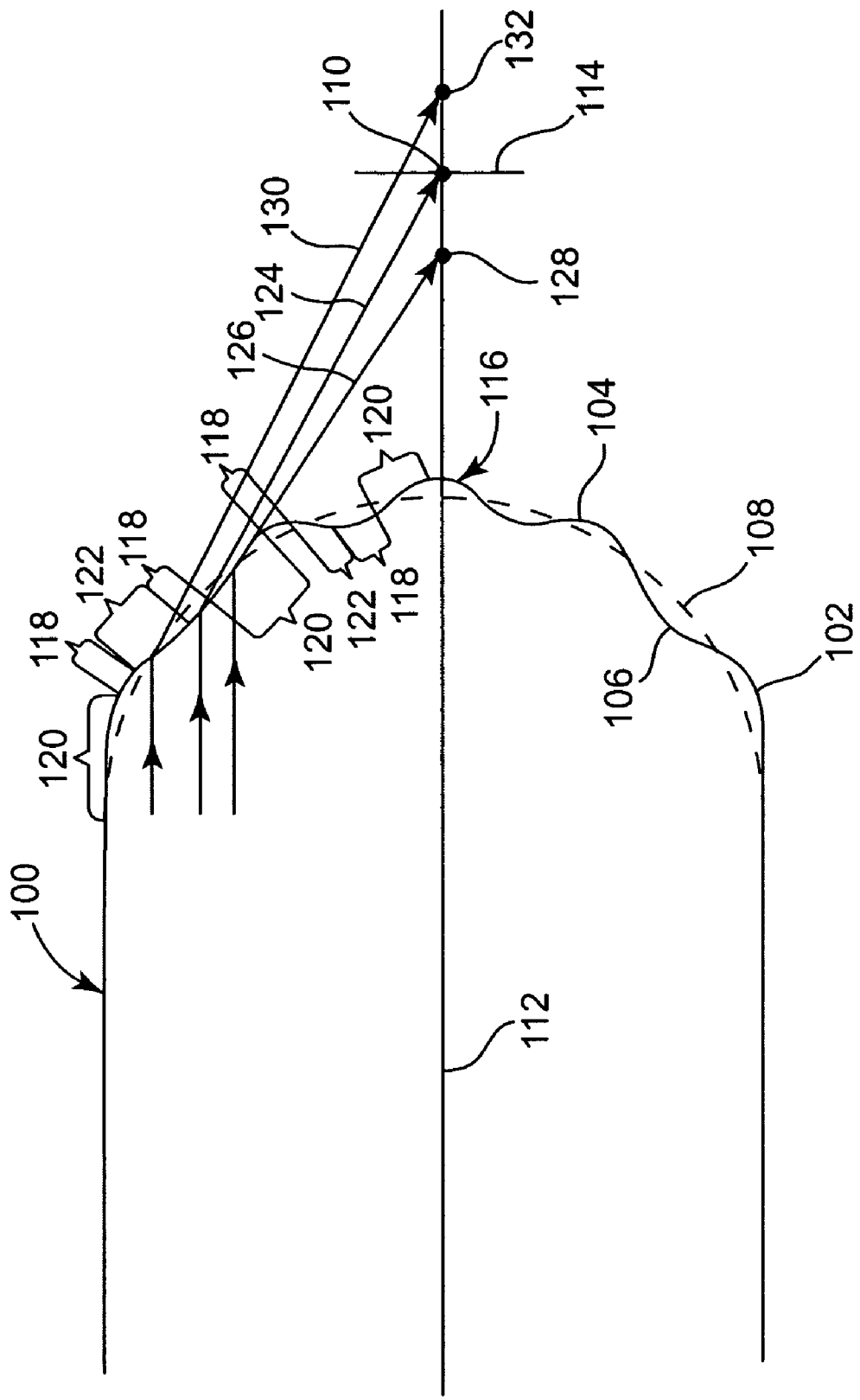
FIG. 2 is a diagram illustrating one embodiment of a lens.

FIG. 2 is a diagram illustrating one embodiment of a lens 100. Lens 100 includes a lens surface 102 that is similar to surface 22 (shown in FIG. 1). In one embodiment, lens surface 102 is disposed on the front side of lens 100. In one embodiment, lens surface 102 is disposed on the back side of the lens. In other embodiments, a lens surface similar to lens surface 102 can be disposed on any suitable surface and on more than one suitable surface of a lens.

Lens surface 102 includes convex elements 104 and concave elements 106. The convex elements 104 and concave elements 106 are sag perturbations from an imaginary un-filtered lens surface, indicated at 108. Imaginary un-filtered lens surface 108 is a smooth curved surface that corresponds to lens 100 prior to the generation of convex elements 104 and concave elements 106. Each of the convex elements 104 includes a positive surface curvature relative to imaginary un-filtered lens surface 108. Each of the concave elements 106 includes a negative surface curvature relative to imaginary un-filtered lens surface 108. The difference between imaginary un-filtered lens surface 108 and lens surface 102 can be defined by one or more mathematical expressions, referred to as sag equations.

Lens 100 includes a focal point 110 along an optical axis 112. The focal point 110 lies in a focal plane 114. Imaginary un-filtered lens surface 108 is curved to focus electromagnetic waves at focal point 110 and provide a minimum spot size in focal plane 114. Lens surface 102, including convex elements 104 and concave elements 106, also focuses electromagnetic waves from an object image into a minimum spot size in focal plane 114. In one embodiment, lens 100 and lens surface 102 are symmetrical about optical axis 112. In other embodiments, lens surface 102 is not symmetrical about optical axis 112. Also, in other embodiments, imaginary un-filtered lens surface 108 can be curved to provide a minimum spot size in any suitable focal plane.

Lens 100 includes convex elements 104 and concave elements 106 in a seamless profile 116. The seamless profile 116 has a defined slope at each point of lens surface 102. The slope of convex elements 104 and concave elements 106 of seamless profile 116 control the spot size in focal plane 114. Seamless profile 116 is continuous and does not include discontinuities, such as cusps. In one embodiment, seamless profile 116 is symmetrical about optical axis 112. In other embodiments, seamless profile 116 is not symmetrical about optical axis 112.

The difference between imaginary un-filtered lens surface 108 and seamless profile 116 can be defined by sag equations. In one embodiment, seamless profile 116 is defined by one or more cubic polynomial functions to provide a filtering surface that produces a controlled amount of spherical aberration in focal plane 114. The one or more cubic polynomial functions are sag equations that define the sag of seamless profile 116. The controlled amount of spherical aberration operates as a low pass filter that passes low spatial frequency information and stops high spatial frequency information. The one or more cubic polynomial functions define the seamless profile to provide an improved stop band for lens 100.

Seamless profile 116 includes properly corrected zones 118, under corrected zones 120, and over corrected zones 122. Properly corrected zones 118 are essentially parallel to the imaginary un-filtered lens surface 108 and include minimal over corrected spherical aberrations and minimal under corrected spherical aberrations. Properly corrected zones 118 refract electromagnetic waves, indicated at 124, to focus the refracted electromagnetic waves 124 at focal point 110 in focal plane 114. Under corrected zones 120 refract electromagnetic waves, indicated at 126, to cross optical axis 112 at 128 in front of focal plane 114. Over corrected zones 122 refract electromagnetic waves, indicated at 130, to cross optical axis 112 at 132 behind focal plane 114.

Lens 100 refracts electromagnetic waves 124, 126, and 130 based on the lens material of lens 100 and the slopes of convex elements 104 and concave elements 106. In one embodiment, seamless profile 116 includes convex elements 104 and concave elements 106 that slope between a minimum slope and a maximum slope, where the magnitude of the minimum slope is essentially equal to the magnitude of the maximum slope. In one embodiment, the surface area with one slope on lens surface 102 is essentially equal to the surface area with any other slope on lens surface 102. With uniform surface area versus slope characteristics, lens surface 102 refracts electromagnetic waves to evenly distribute the refracted electromagnetic waves in focal plane 114. This even distribution of refracted electromagnetic waves maintains focal plane 114 in the same place and reduces high spatial frequency components to improve the stop band response of lens 100.

Figure 3:
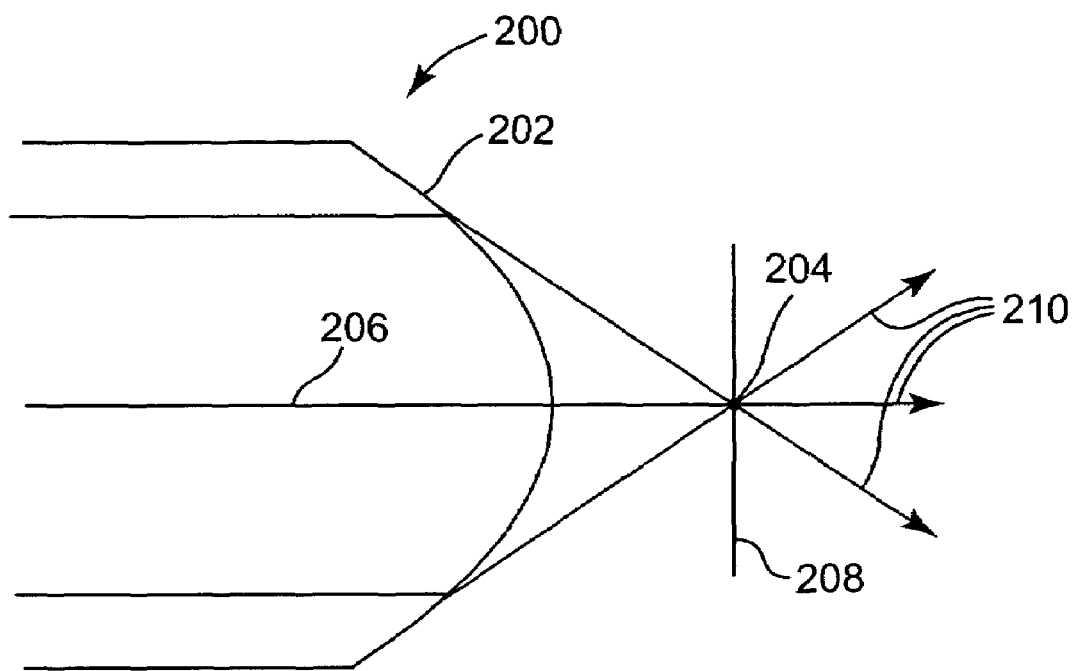
FIG. 3 is a diagram illustrating a lens having a smooth lens surface.

FIG. 3 is a diagram illustrating a lens 200 having a smooth lens surface 202. Lens 200 corresponds to lens 100 of FIG. 2 prior to the generation of sag perturbations, such as convex elements 104 and concave elements 106. Lens surface 202 is similar to imaginary un-filtered lens surface 108 (shown in FIG. 2).

Lens 200 includes a focal point 204 along an optical axis 206 and in focal plane 208. Lens 200 and lens surface 202 are symmetrical about optical axis 206. Lens surface 202 is a smooth curved lens surface that refracts electromagnetic waves to focus the refracted electromagnetic waves at focal point 204 and provide a minimum spot size in focal plane 208.

Lens 200 refracts electromagnetic waves, indicated at 210, based on the lens material of lens 200 and the curve of lens surface 202. In one embodiment, lens 200 is made of plastic. In one embodiment, lens 200 is made of glass. In other embodiments, lens 200 can be made of any suitable material.

Sag perturbations, such as convex elements 104 and concave elements 106 (shown in FIG. 2), can be configured into lens 200 to produce a lens. The fabrication of a film may be performed by a rolling process with a suitably tooled roller. Alternatively, the fabrication can utilize an etching process or deposition process. For simple plastic lenses, the required profile can be added to a molding tool.

Figure 4:
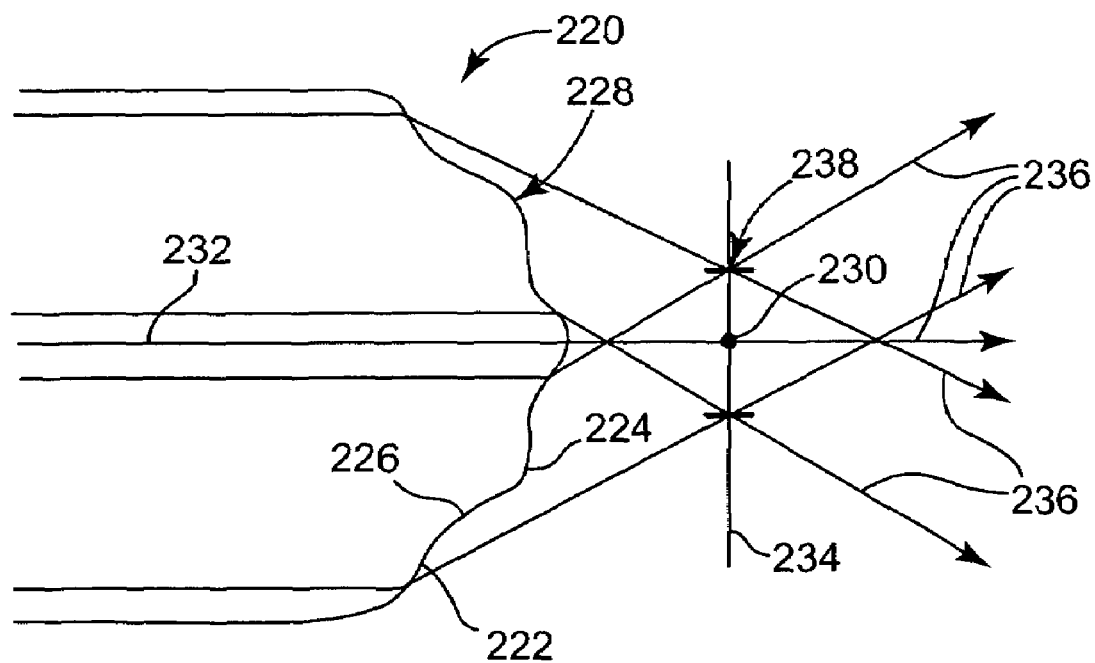
FIG. 4 is a diagram illustrating one embodiment of a lens that includes a lens surface having convex elements and concave elements.

FIG. 4 is a diagram illustrating one embodiment of a lens 220 that includes a lens surface 222 having convex elements 224 and concave elements 226. Lens 220 is similar to lens 100 of FIG. 2 and lens surface 222 is similar to lens surface 102 (shown in FIG. 2). Convex elements 224 and concave elements 226 are sag perturbations from a smooth lens surface, such as the smooth lens surface 202 (shown in FIG. 3). The difference between the smooth lens surface and lens surface 222 can be defined by one or more sag equations.

Lens surface 222 includes convex elements 224 and concave elements 226 in a seamless profile 228. Seamless profile 228 is continuous and does not include discontinuities, such as cusps. Also, seamless profile 228 has a defined slope at each point of lens surface 222.

Lens 220 refracts electromagnetic waves based on the lens material of lens 220 and the slopes of convex elements 224 and concave elements 226. In one embodiment, lens 220 is made of plastic. In one embodiment, lens 220 is made of glass. In other embodiments, lens 220 can be made of any suitable material.

Lens 220 includes a focal point 230 along an optical axis 232. The focal point 230 lies in a focal plane 234. Lens surface 222 focuses electromagnetic waves 236 into a minimum spot size, indicated at 238, in focal plane 234. The slope of seamless profile 228, including convex elements 224 and concave elements 226, controls the spot size 238 in focal plane 234. In one embodiment, lens 220 and lens surface 222 are symmetrical about optical axis 232. In one embodiment, seamless profile 228 is defined by one or more cubic polynomial sag equations to provide a filtering surface that produces a controlled amount of spherical aberration in focal plane 234. The one or more cubic polynomial functions are sag equations that define the sag of seamless profile 228 from a smooth surface, such as smooth lens surface 202 (shown in FIG. 3). The controlled amount of spherical aberration operates as a low pass filter that passes low spatial frequency information and stops high spatial frequency information. The one or more cubic polynomial functions define the seamless profile to provide an improved stop band for lens 220.

Figure 5:
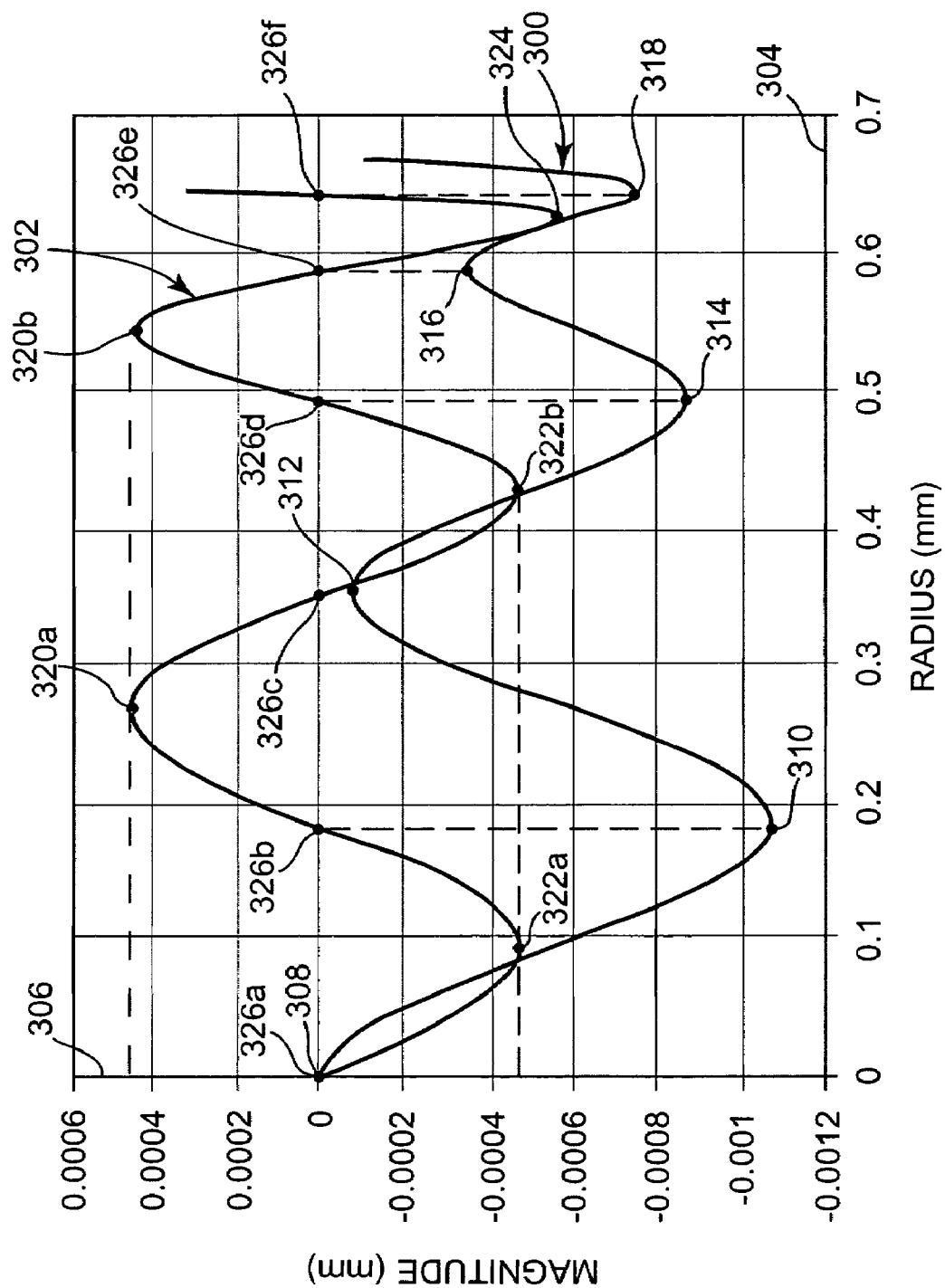
FIG. 5 is a plot diagram illustrating one embodiment of surface sag and surface sag slope.

FIG. 5 is a plot diagram illustrating one embodiment of surface sag 300 and surface sag slope 302. Surface sag 300 is similar to a seamless profile of a lens surface in a lens. Surface sag slope 302 is the slope of surface sag 300. Surface sag 300 can be disposed on a smooth lens surface, such as smooth lens surface 202 (shown in FIG. 3), to produce the seamless profile of the lens surface.

Surface sag 300 and surface sag slope 302 are symmetric about the optical axis of the lens. Surface sag 300 and surface sag slope 302 are plotted from the optical axis of the lens along a radius leading away from the optical axis. The radial distance or radius is plotted along the x axis at 304 in millimeters (mm) and magnitudes of surface sag 300 and surface sag slope 302 are plotted along the y axis at 306 in mm.

Surface sag 300 is defined by one or more sag equations that have been previously described in the art, such as in U.S. Pat. No. 6,717,735, entitled "Lens Structure For Flux Redistribution And For Optical Low Pass Filtering," issued to Smith on Apr. 6, 2004. Surface sag 300 is defined by a sag equation that is an even order polynomial deviation, such as a $12^{th}$ order polynomial deviation, derived via integration from an odd order polynomial, such as an $11^{th}$ order Chebychev polynomial. Surface sag slope 302 is determined by taking a derivative of the $12^{th}$ order polynomial function. The sag equation expresses the difference or deviations of a lens surface having surface sag 300 from a smooth surface, such as smooth lens surface 202 (shown in FIG. 3).

Surface sag 300 has an oscillating form and a maximum sag value at 308 of 0 mm at the optical axis or radius of 0 mm. Surface sag 300 has a minimum sag value at 310 at a radius of just less than 0.2 mm from the optical axis. The minimum sag value at 310 is less than −0.001 mm. At about 0.35 mm from the optical axis, surface sag 300 rises to a maximum sag value at 312 that is between 0 and −0.0002 mm and at a radius of just less than 0.5 mm surface sag 300 falls to a minimum sag value at 314 that is between −0.0008 and −0.001 mm. Surface sag 300 rises to a maximum sag value between −0.0002 and −0.0004 mm at 316 at a radius of just less than 0.6 mm and surface sag 300 dips to a minimum sag value at 318 between −0.0006 and −0.0008 mm at a radius of about 0.65 mm.

The Chebychev polynomial sag equation defines a surface sag slope 302 that has an oscillating form between maximum slope values, indicated at 320a and 320b, and minimum slope values, indicated at 322a and 322b. The magnitudes of maximum slope values 320a and 320b are essentially equal to the magnitudes of minimum slope values 322a and 322b. However, beyond a radius of about 0.6 mm, the magnitudes of minimum and maximum slope values, such as minimum slope value 324, are not essentially equal to the magnitudes of maximum slope values 320a and 320b and minimum slope values 322a and 322b. This difference in the magnitudes of the slope values beyond a radius of 0.6 mm is due to using rounded off parameters in the $12^{th}$ order polynomial sag equation that defines surface sag 300. The surface sag slope 302 includes zero slope values at 326a-326f, which correspond with maximum and minimum sag values at 308, 310, 312, 314, 316, and 318.

Surface sag 300 has a rounded form near maximum sag values at 308, 312, and 316 and minimum sag values at 310, 314, and 318, which correspond to zero slope values 326a-326f of surface sag slope 302. Also, surface sag slope 302 has a rounded form near maximum slope values at 320a and 320b and minimum slope values at 322a, 322b and 324. As a result, a lens surface having surface sag 300 and surface sag slope 302 includes more surface area with slopes near zero slope values 326a-326f, maximum slope values 320a and 32b, and minimum slope values 322a, 322b, and 324 than at other slope values.

The lens that includes surface sag 300 and surface sag slope 302 creates three fairly distinct sharp images that include high spatial frequency information. One image that includes high spatial frequency information is created at the focal plane of the lens due to more surface area near zero slope values 326a-326f. A second image that includes high spatial frequency information is created at a minimum focal distance from the lens inside the focal plane, and a third image that includes high spatial frequency information is created at a maximum focal distance outside the focal plane. The second and third images are due to more surface area on the lens surface near the minimum slope values at 322a, 322b, and 324 and maximum slope values at 320a and 320b. These three images include high spatial frequency information in the stop band of the lens that includes surface sag 300. The high spatial frequency information in the three images is not filtered out by the lens surface having surface sag 300. Un-filtered high spatial frequency information can lead to aliasing errors in an imaging system and artifacts in the resulting image.

Figure 6:
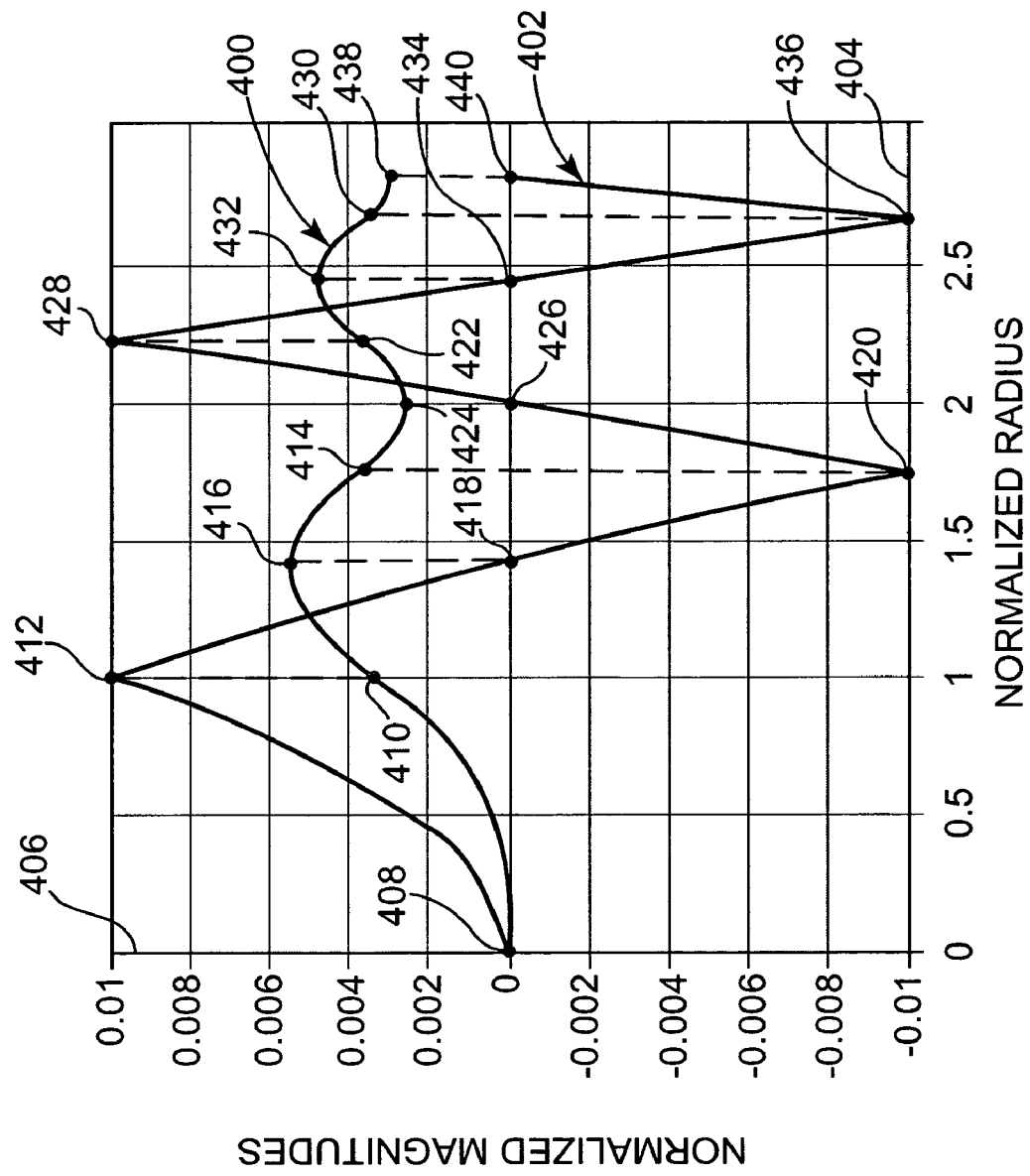
FIG. 6 is a plot diagram illustrating one embodiment of surface sag and surface sag slope, which provide improved high spatial frequency stop band characteristics in a lens.

FIG. 6 is a plot diagram illustrating one embodiment of surface sag 400 and surface sag slope 402, which provide improved high spatial frequency stop band characteristics in a lens. Surface sag 400 is defined by a family of cubic polynomial equations described in detail herein. In other embodiments, surface sag 400 and surface sag slope 402 can be defined by any suitable cubic polynomial equation or family of cubic polynomial equations.

Surface sag 400 is similar to a seamless profile of a lens surface in a lens, such as seamless profile 116 (shown in FIG. 2) and seamless profile 228 (shown in FIG. 4). Surface sag slope 402 is the slope of surface sag 400. Surface sag 400 can be disposed on a smooth lens surface, such as smooth lens surface 202 (shown in FIG. 3), to produce the seamless profile of the lens surface.

Surface sag 400 and surface sag slope 402 are symmetric about the optical axis of the lens. Surface sag 400 and surface sag slope 402 are plotted from the optical axis of the lens along a radius leading away from the optical axis. The radial distance or radius is plotted along the x axis at 404 as a normalized radius value. Magnitudes of surface sag 400 and surface sag slope 402 are plotted along the y axis at 406 as normalized magnitudes.

Surface sag 400 is defined by a family of sag equations. Each sag equation in the family of sag equations is a cubic polynomial function that defines a portion of surface sag 400, such as a quarter cycle or a half cycle of surface sag 400. Adjacent portions of surface sag 400 are defined by different sag equations in the family of sag equations. The resulting surface sag 400 and lens surface are continuous in magnitude and slope at the boundary between adjacent portions. However, the second derivative of the sag equations changes at each boundary. The family of sag equations expresses the difference or deviations in a lens surface having surface sag 400 from a smooth surface, such as smooth lens surface 202 (shown in FIG. 3).

Surface sag 400 has an oscillating form that has a minimum sag value of 0 at 408 at the optical axis or normalized radius of 0. Surface sag slope 402 has a slope value of 0 at 408. The first quarter cycle of surface sag 400 is defined from 408 at a radius of 0 to 410 at a normalized radius of 1 by the following Equation I.

$$S1 = k \times r^3 \quad 0 < r < R \qquad \text{Equation I}$$

In Equation I, S1 is the sag value of surface sag 400 as defined with respect to r from a radius of 0 to a radius of R. The radius plotted along the x axis at 404 is normalized with respect to R, where R is the radius at a first maximum slope at 412 of surface sag slope 402. The value k is common to all equations in the family of sag equations and determines the radial scale of surface sag 400. At a normalized radius of 1, surface sag 400 has a sag value of between 0.002 and 0.004 at 410 and surface sag slope 402 has a maximum slope value of about 0.01 at 412.

The next half cycle of surface sag 400 is defined from the normalized radius of 1 at 410 to a normalized radius of the square root of 3 at 414 by the following Equation II.

$$S2 = -k \times r^3 + (1) \times 6 \times k \times R^2 \times r - 4 \times k \times R^3 \times (1) \quad R < r < R \times \sqrt{3} \qquad \text{Equation II}$$

In Equation II, S2 is the sag value of surface sag 400 as defined with respect to r from a radius of R to a radius of R times the square root of 3. Surface sag 400 rises from a sag value of between 0.002 and 0.004 at 410 to a maximum sag value of between 0.004 and 0.006 at 416. Surface sag slope 402 falls from the maximum slope value of 0.01 at 412 to a slope value of 0 at 418. At the radius of R times the square root of 3, surface sag slope 402 is at a first minimum slope value of about −0.01 at 420 and surface sag 400 has a sag value of about 0.004 at 414. The magnitudes of the maximum slope value at 412 and the minimum slope value at 420 are essentially the same.

The next half cycle of surface sag 400 is defined from the normalized radius of the square root of 3 at 414 to a normalized radius of the square root of 5 at 422 by the following Equation III.

$$S3 = k \times r^3 - (2) \times 6 \times k \times R^2 \times r - 4 \times k \times R^3 \times (1 - 3 \times \sqrt{3}) \qquad \text{Equation III}$$

where, $R \times \sqrt{3} < r < R \times \sqrt{5}$

In Equation III, S3 is the sag value of surface sag 400 as defined with respect to r from a radius of R times the square root of 3 to a radius of R times the square root of 5. Surface sag 400 falls from a sag value of about 0.004 at 414 to a minimum sag value of between 0.002 and 0.004 at 424. Surface sag slope 402 rises from the minimum slope value of −0.01 at 420 to a slope value of 0 at 426. At the radius of R times the square root of 5, surface sag slope 402 rises to a second maximum slope value at 428 of 0.01 and surface sag 400 has a sag value of about 0.004 at 422. The magnitudes of the maximum slope values at 412 and 428 and the minimum slope value at 420 are essentially the same.

The next half cycle of surface sag 400 is defined from the normalized radius of the square root of 5 at 422 to a normalized radius of the square root of 7 at 430 by the following Equation IV.

$$S4 = -k \times r^3 + (3) \times 6 \times k \times R^2 \times r - 4 \times k \times R^3 \times (1 - 3 \times \sqrt{3} + 5 \times \sqrt{5}) \qquad \text{Equation IV}$$

where, $R \times \sqrt{5} < r < R \times \sqrt{7}$

In Equation IV, S4 is the sag value of surface sag 400 as defined with respect to r from a radius of R times the square root of 5 to a radius of R times the square root of 7. Surface sag 400 rises from a sag value of about 0.004 at 422 to a maximum sag value of between 0.004 and 0.006 at 432. Surface sag slope 402 falls from the maximum slope value of 0.01 at 428 to a slope value of 0 at 434. At the radius of R times the square root of 7, surface sag slope 402 falls to a second minimum slope value at 436 of −0.01 and surface sag 400 has a sag value of about 0.004 at 430. The magnitudes of the maximum slope values at 412 and 428 and the minimum slope values at 420 and 436 are essentially the same.

The next quarter cycle of surface sag 400 is defined from 430 at a normalized radius of the square root of 7 to 438 at a normalized radius of the square root of 8 by the following Equation V.

$$S5 = k \times r^3 - (4) \times 6 \times k \times R^2 \times r - 4 \times k \times R^3 \times (1 - 3 \times \sqrt{3} + 5 \times \sqrt{5} - 7 \times \sqrt{7}) \qquad \text{Equation V}$$

where, $R \times \sqrt{7} < r < R \times \sqrt{8}$

In Equation V, S5 is the sag value of surface sag 400 as defined with respect to r from a radius of R times the square root of 7 to a radius of R times the square root of 8, where R times the square root of 8 is the radius at the slope value of 0 at 440 of surface sag slope 402. At a normalized radius of the square root of 8, surface sag 400 has a sag value between 0.002 and 0.004 and surface sag slope 402 has a slope value of 0, completing two full cycles of surface sag 400 and surface sag slope 402.

Equations I-V, which define surface sag 400, are written to show the iterative nature of the family of sag equations. Other equations in the family of sag equations can be written by inspection of Equations I-V to provide a greater number of cycles of surface sag 400. In other embodiments, surface sag 400 can include any suitable number of half cycles of sag perturbations, such as from 1 to 8 half cycles (i.e., from 1 half cycle to 4 cycles) of sag perturbations.

A lens having surface sag 400 includes an essentially equal amount of surface area having each slope value between the maximum slope values of about 0.01 at 412 and 428 and the minimum slope values of about −0.01 at 420 and 436. Surface sag slope 402 has a slightly curved and essentially straight line form between maximum slope values at 412 and 428 and minimum slope values at 420 and 436. This slightly curved and essentially straight line form of surface sag slope 402 produces the uniform distribution of surface area versus slope. The minimum and maximum slope values contribute to defining the spot size in the focal plane of the lens.

A lens that includes surface sag 400 and surface sag slope 402 creates a blurred or fuzzy image and an increased spot size in the focal plane of the lens. The blurred or fuzzy image created by the lens is essentially free of sharp images and essentially free of high spatial frequency information in the stop band of the lens. A lens that includes surface sag 400 and surface sag slope 402 can create a four times reduction in the point spread function Strehl ratio, compared to the Strehl ratio of a lens that includes surface sag 300 and surface sag slope 302 (shown in FIG. 5).

Low spatial frequency information is passed and high spatial frequency information is filtered out by the lens surface having surface sag 400. Thus, the lens that includes surface sag 400 and surface sag slope 402 operates as a low pass filter for spatial frequency information. The magnitude of high spatial frequency information passed through the lens is reduced, which reduces aliasing errors in an imaging system and artifacts in the resulting image.

In other embodiments, the surface sag and surface sag slope of a lens can be defined by a sag equation or family of sag equations of the cubic polynomial form of Equation VI.

$$SAG = k \times r^3 + b \times r + c \qquad \text{Equation VI}$$

In Equation VI, SAG is the sag value of the surface sag as defined with respect to r over some limited range of radii. The value k is common to all equations in the family of sag equations and determines the radial scale of the surface sag. The parameter b is different for each equation in the family of sag equations and determines the maximum and/or minimum slope produced by the surface sag. The parameter c is also different for each equation in the family of sag equations and ensures continuity between portions of the surface sag. The resulting surface sag and lens surfaces are continuous in magnitude and slope at boundaries between portions of the surface sag. However, the second derivative of the sag equations changes at each boundary.

In other embodiments, surface sag and surface sag slope can be defined by a sag equation or family of sag equations of the cubic polynomial form of Equation VI and the radial scale can be altered between portions of surface sag. The value k takes on a different value for different sag equations in the family of sag equations. The resulting surface sag and lens surface are continuous in magnitude and slope at the boundaries between portions of the surface sag. In any embodiment, the surface sag and surface sag slope provide improved high spatial frequency information stop band characteristics.

Figure 7:
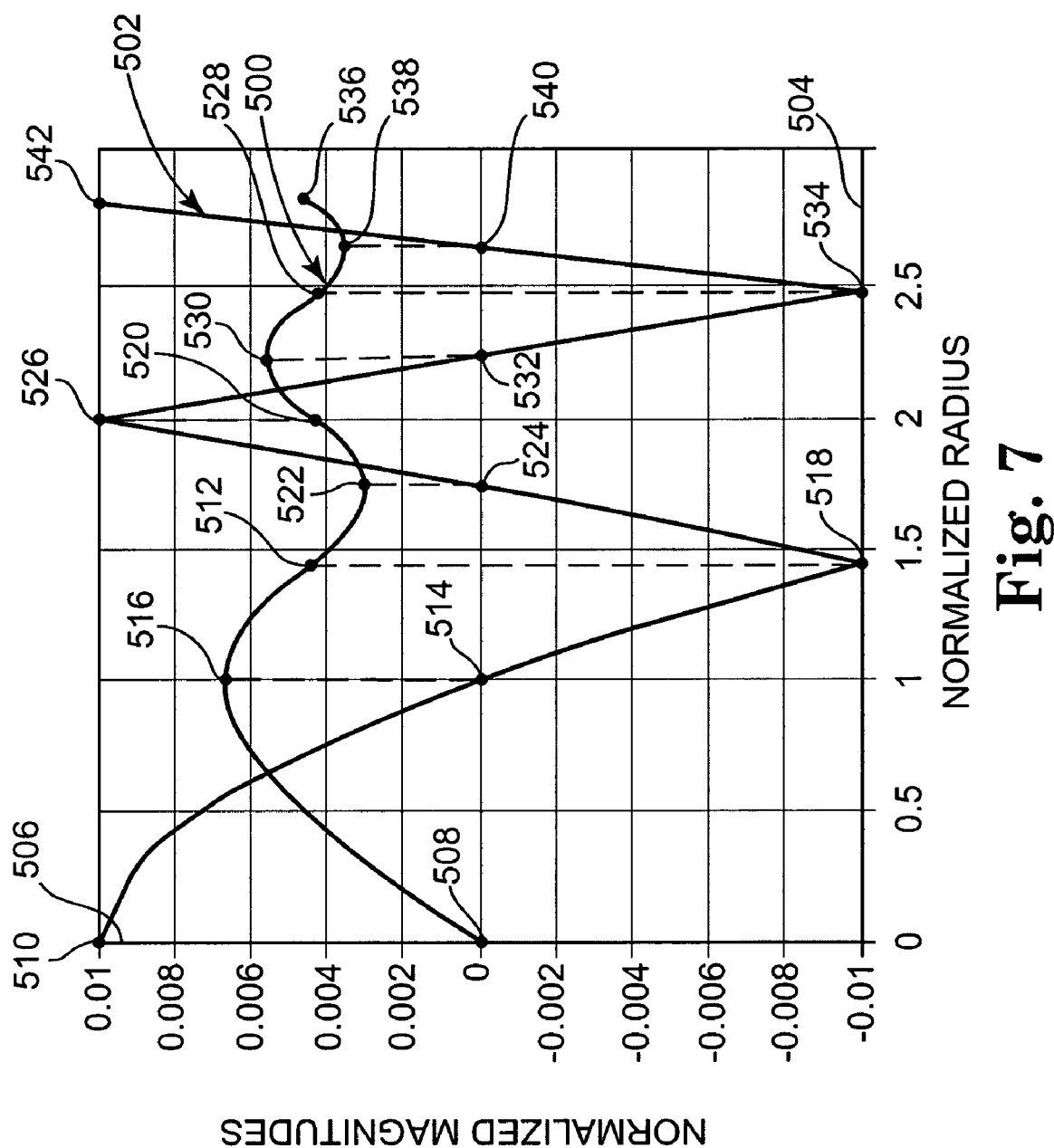
FIG. 7 is a plot diagram illustrating another surface sag and surface sag slope, which provide improved high spatial frequency stop band characteristics in a lens.

FIG. 7 is a plot diagram illustrating another surface sag 500 and surface sag slope 502, which provide improved high spatial frequency stop band characteristics in a lens. Surface sag 500 is defined by a family of cubic polynomial equations described in detail herein. Surface sag slope 502 is at a maximum slope value at the optical axis of the lens, as compared to surface sag slope 402 (shown in FIG. 6), which is at a slope value of 0 at the optical axis of the lens. In other embodiments, surface sag slope 502 can be at any suitable slope value at the optical axis of the lens. Also, in other embodiments, surface sag 500 and surface sag slope 502 can be defined by any suitable cubic polynomial equation or family of cubic polynomial equations.

Surface sag 500 is similar to the seamless profile of a lens surface in a lens, such as seamless profile 116 (shown in FIG. 2) and seamless profile 228 (shown in FIG. 4). Surface sag slope 502 is the slope of surface sag 500. Surface sag 500 can be disposed on a smooth lens surface, such as smooth lens surface 202 (shown in FIG. 3), to produce the seamless profile of the lens surface.

Surface sag 500 and surface sag slope 502 are symmetric about the optical axis of the lens. Surface sag 500 and surface sag slope 502 are plotted from the optical axis of the lens along a radius leading away from the optical axis. The radial distance or radius is plotted along the x axis at 504 as a normalized radius value. Magnitudes of surface sag 500 and surface sag slope 502 are plotted along the y axis at 506 as normalized magnitudes.

Surface sag 500 is defined by a family of sag equations. Each sag equation in the family of sag equations is a cubic polynomial function that defines a portion of surface sag 500, such as a half cycle of surface sag 500. Adjacent portions of surface sag 500 are defined by different sag equations in the family of sag equations. The resulting surface sag 500 and lens surface are continuous in magnitude and slope at the boundary between adjacent portions. However, the second derivative of the sag equations changes at each boundary. The family of sag equations expresses the difference or deviations in a lens surface having surface sag 500 from a smooth surface, such as smooth lens surface 202 (shown in FIG. 3).

Surface sag 500 has an oscillating form that has a sag value of 0 at 508 at the optical axis or normalized radius of 0. Surface sag slope 502 has a maximum slope value of 0.01 at 510. The first half cycle of surface sag 500 is defined from 508 at a radius of 0 to 512 at a normalized radius of the square root of 2 by the following Equation VII.

$$S7 = -k \times r^3 + (1) \times 3 \times k \times R^2 \times r \quad 0 < r < R\sqrt{2} \qquad \text{Equation VII}$$

In Equation VII, S7 is the sag value of surface sag 500 as defined with respect to r from a radius of 0 to a radius of R times the square root of 2. The radius plotted along the x axis at 504 is normalized with respect to R, where R is the radius at the first slope value of 0 at 514 of surface sag slope 502. The value k is common to all equations in the family of sag equations and determines the radial scale of surface sag 500. Surface sag 500 rises from a sag value of 0 at 508 to a maximum sag value of between 0.006 and 0.008 at 516. Surface sag slope 502 falls from the maximum slope value of 0.01 at 510 to the slope value of 0 at 514. At the radius of R times the square root of 2, surface sag slope 502 is at a first minimum slope value of about −0.01 at 518 and surface sag 500 has a sag value of between 0.004 and 0.006 at 512. The magnitudes of the maximum slope value at 510 and the minimum slope value at 518 are essentially the same.

The next half cycle of surface sag 500 is defined from the normalized radius of the square root of 2 at 512 to a normalized radius of the square root of 4 or a value of 2 at 520 by the following Equation VIII.

$$S8 = k \times r^3 - (3) \times 3 \times k \times R^2 \times r + 8 \times \sqrt{2} \times k \times R^3 \times (1) \qquad \text{Equation VIII}$$

where, $R \times \sqrt{2} < r < R \times \sqrt{4}$

In Equation VIII, S8 is the sag value of surface sag 500 as defined with respect to r from a radius of R times the square root of 2 to a radius of R times the square root of 4. Surface sag 500 falls from a sag value of between 0.004 and 0.006 at 512 to a minimum sag value of between 0.002 and 0.004 at 522. Surface sag slope 502 rises from the minimum slope value of −0.01 at 518 to a slope value of 0 at 524. At the radius of R times the square root of 4, surface sag slope 502 is at a second maximum slope value of about 0.01 at 526 and surface sag 500 has a sag value of about 0.004 at 520. The magnitudes of the maximum slope values at 510 and 526 and the minimum slope value at 518 are essentially the same.

The next half cycle of surface sag 500 is defined from the normalized radius of the square root of 4 at 520 to a normalized radius of the square root of 6 at 528 by the following Equation IX.

$$S9 = -k \times r^3 + (5) \times 3 \times k \times R^2 \times r + 8 \times \sqrt{2} \times k \times R^3 (1 - 2 \times \sqrt{2}) \quad \text{Equation IX}$$

where, $R \times \sqrt{4} < r < R \times \sqrt{6}$

In Equation IX, S9 is the sag value of surface sag 500 as defined with respect to r from a radius of R times the square root of 4 to a radius of R times the square root of 6. Surface sag 500 rises from a sag value of just above 0.004 at 520 to a maximum sag value of between 0.004 and 0.006 at 530. Surface sag slope 502 falls from the maximum slope value of 0.01 at 526 to a slope value of 0 at 532. At the radius of R times the square root of 6, surface sag slope 502 falls to a second minimum slope value at 534 of −0.01 and surface sag 500 has a sag value of just above 0.004 at 528. The magnitudes of the maximum slope values at 510 and 526 and the minimum slope values at 518 and 534 are essentially the same.

The next half cycle of surface sag 500 is defined from the normalized radius of the square root of 6 at 528 to a normalized radius of the square root of 8 at 536 by the following Equation X.

$$S10 = k \times r^3 - (7) \times 3 \times k \times R^2 \times r + 8 \times \sqrt{2} k \times R^3 \times (1 - 2 \times \sqrt{2} + 3 \times \sqrt{3}) \quad \text{Equation X}$$

where, $R \times \sqrt{6} < r < R \times \sqrt{8}$

In Equation X, S10 is the sag value of surface sag 500 as defined with respect to r from a radius of R times the square root of 6 to a radius of R times the square root of 8. Surface sag 500 falls from a sag value of just above 0.004 at 528 to a minimum sag value of between 0.002 and 0.004 at 538. Surface sag slope 502 rises from the minimum slope value of −0.01 at 534 to a slope value of 0 at 540. At the radius of R times the square root of 8, surface sag slope 502 rises to a third maximum slope value at 542 of 0.01 and surface sag 500 has a sag value of just above 0.004 at 536, completing two full cycles of surface sag 500 and surface sag slope 502. The magnitudes of the maximum slope values at 510, 526, and 542 and the minimum slope values at 518 and 534 are essentially the same.

Equations VII-X, which define surface sag 500, are written to show the iterative nature of the family of sag equations. Other equations in the family of sag equations can be written by inspection of Equations VII-X to include a greater number of cycles of surface sag 500. In other embodiments, surface sag 500 can include any suitable number of half cycles of sag perturbations, such as from 1 to 8 half cycles (i.e., from 1 half cycle to 4 cycles) of sag perturbations.

A lens having surface sag 500 includes an essentially equal amount of surface area having each slope value between the maximum slope values of about 0.01 at 510, 526, and 542 and the minimum slope values of about −0.01 at 518 and 534. Surface sag slope 502 has a slightly curved and essentially straight line form between maximum slope values at 510, 526, and 542 and minimum slope values at 518 and 534. This slightly curved and essentially straight line form of surface sag slope 502 produces the uniform distribution of surface area versus slope. The minimum and maximum slope values contribute to defining the spot size in the focal plane of the lens.

A lens that includes surface sag 500 and surface sag slope 502 creates a blurred or fuzzy image and an increased spot size in the focal plane of the lens. The blurred or fuzzy image created by the lens is essentially free of sharp images and essentially free of high spatial frequency information in the stop band of the lens. A lens that includes surface sag 500 and surface sag slope 502 can create a four times reduction in the point spread function Strehl ratio, compared to the Strehl ratio of a lens that includes surface sag 300 and surface sag slope 302 (shown in FIG. 5).

Low spatial frequency information is passed and high spatial frequency information is filtered out by the lens surface having surface sag 500. Thus, the lens that includes surface sag 500 and surface sag slope 502 operates as a low pass filter for spatial frequency information. The magnitude of high spatial frequency information passed through the lens is reduced, which reduces aliasing errors in an imaging system and artifacts in the resulting image.

Figure 8:
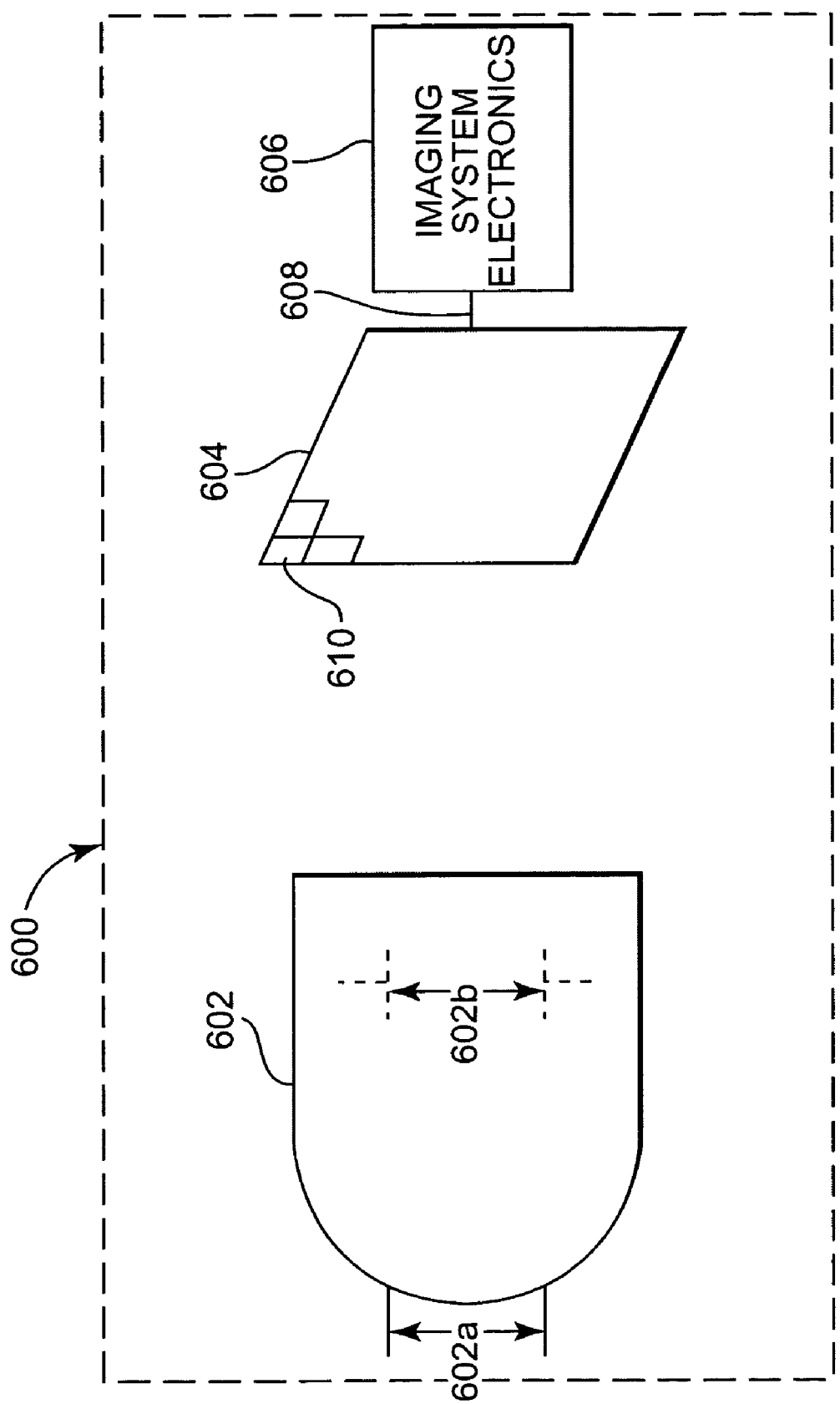
FIG. 8 is a diagram illustrating one embodiment of an imaging system that includes a lens having surface sag.

FIG. 8 is a diagram illustrating one embodiment of an imaging system 600 that includes a lens having surface sag, such as surface sag 400 (shown in FIG. 6) or surface sag 500 (shown in FIG. 7). Imaging system 600 is a digital imaging system, such as a digital still camera, a digital video camera or an optical navigation computer mouse. Imaging system 600 includes optics 602, an image sensor 604, and imaging system electronics 606. Image sensor 604 is situated in the focal plane of optics 602 and coupled to imaging system electronics 606 via conductive path 608.

Image sensor 604 includes photo detectors 610 that convert electromagnetic waves into corresponding digital signals. Each of the photo detectors 610 corresponds to a pixel in a resulting image. In one embodiment, image sensor 604 is a charge couple device (CCD). In one embodiment, image sensor 604 is a complimentary metal oxide semiconductor (CMOS) array imaging device. In other embodiments, image sensor 604 can be any suitable image sensing device.

Optics 602 receives electromagnetic waves, such as light, from an object image and focuses electromagnetic waves on image sensor 604. Image sensor 604 receives the focused electromagnetic waves and converts the focused electromagnetic waves into digital signals. Imaging system electronics 606 receives and processes the digital signals.

Imaging system 600 is a sampling device that samples object image information in space. The spatial sampling rate of imaging system 600 is dependent on the size and spacing of photo detectors 610 in image sensor 604. For example, if the centers of photo detectors 610 are spaced at 10 microns, the sampling rate is 100 samples per mm. The Nyquist criteria states that when the information to be captured contains frequencies that are greater than one half the sampling rate of the device, the resulting captured image can include aliasing errors and artifacts or false information. Thus, if imaging system 600 samples at a rate of 100 samples per mm and the object image information presented to image sensor 604 contains high spatial frequency information greater than 50 samples per mm, aliasing errors can occur and artifacts or erroneous information may be contained in the resulting image. Furthermore, these errors or artifacts cannot be removed from the resulting image and the artifacts render the resulting image with noticeable noise or other undesirable and unsightly features.

One design consideration in a digital imaging system, such as imaging system 600, is to ensure compliance with the Nyquist criteria. Optics, such as optics 602, can be employed to filter out high spatial frequency information, such that the object image information presented to image sensor 604 meets the Nyquist criteria. A lens that includes surface sag, such as surface sag 400 (shown in FIG. 6) or surface sag 500 (shown in FIG. 7), provides a low cost, functional, anti-aliasing filter without using expensive birefringent materials, such as crystalline structures.

In one embodiment, optics 602 includes a lens that includes surface sag 500 situated in the plane of an aperture stop 602*a*. The aperture stop 602*a* is imaged as the exit pupil 602*b* of optics 602. The spot size of the object image on imaging sensor 604 is determined by optics 602 and the slopes of surface sag 500.

In imaging systems that have a smooth lens, the sharpness of an object image increases as the aperture is stopped down.

In contrast, in imaging system 600 that includes the lens with surface sag 500, the lens and surface sag 500 controls the fuzziness of the object image, essentially independent of the aperture size. The lens having surface sag 500 filters out high spatial frequency information to provide a blurred or fuzzy image independent of the aperture size by employing portions of the lens surface area to create over corrected spherical aberration and under correction spherical aberration. The aperture can be stopped down by half cycle increments to include only one half cycle of surface sag 500 without changing the modulation transfer function of the lens, which still produces a uniform distribution of surface area verses slope. This uniform distribution of surface area versus slope provides the blurred or fuzzy image that does not contain filtered out high spatial frequency information.

Surface sag, such as surface sag 400 (shown in FIG. 6) and surface sag 500 (shown in FIG. 7), can be placed on a separate flat surface or lens. Alternatively, the surface sag can be added to the curved profile of an existing surface in an appropriate location. The lens including surface sag, such as surface sag 400 or surface sag 500, provides an improved high spatial frequency stop band characteristic that prevents high spatial frequencies from being presented to the image sensor, such as image sensor 604. Filtering out the high spatial frequency information reduces aliasing and artifacts in the resulting image. Also, the lens including surface sag, such as surface sag 500, provides optical filtering essentially without dependence on the f-number of the aperture.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A low-pass-filter, anti-aliasing lens, comprising:
a first outer lens surface configured to receive light waves incident thereon;
a second outer lens surface configured to transmit light waves transmitted through the lens from the first lens surface;
and a changeable aperture operably associated with the lens;
wherein at least one of the first outer lens surface and the second outer lens surface is defined by a seamless profile comprising a plurality of adjoining concave and convex segments having sag perturbations disposed therealong, the seamless profile and sag perturbations being configured to reduce spatial aliasing in an image produced by the lens along a focal plane associated therewith so as to pass predetermined lower spatial frequencies and reject predetermined higher spatial frequencies; the lens, the first and second outer lens surfaces, and the aperture having an optical axis associated therewith, each of the plurality of adjoining segments being defined by a cubic polynomial function unique thereto and being rotationally symmetric in respect of the optical axis, the first and second outer lens surfaces being symmetric about the optical axis, the sag perturbations being configured to provide a controlled amount of spherical aberration such that the amount of spherical aberration provided by the lens is substantially independent of changes in the aperture.

2. The lens of claim 1, wherein the seamless profile has between 1 and 8 half cycles of sag perturbations disposed therealong.

3. The lens of claim 1, wherein the profile further includes at least one of one quarter cycle of sag perturbations and one half cycle of sag perturbations disposed therealong.

4. The lens of claim 1, wherein the sag perturbations have maximum slopes and minimum slopes of substantially the same magnitude.

5. The lens of claim 1, wherein first portions of the lens are configured to over-correct for spherical aberration and second portions of the lens are configured under-correct for spherical aberration.

6. The lens of claim 1, wherein the seamless profile follows a first cubic polynomial function and a second cubic polynomial function in a family of cubic polynomial functions having the same slope at a selected radius value in respect of the optical axis.

7. The lens of claim 1, wherein the seamless profile follows a first cubic polynomial function and a second cubic polynomial function in a family of cubic polynomial functions having the same magnitude at a selected radius value in respect of the optical axis.

8. The lens of claim 1, wherein the spherical aberration produced by at least portions of the lens is under-corrected.

9. The lens of claim 1, wherein the spherical aberration produced by at least portions of the lens is over-corrected.

10. A method of optically filtering light, comprising:
providing a first outer lens surface configured to receive light waves incident thereon;
providing a second outer lens surface configured to transmit light waves transmitted through the lens from the first outer lens surface; and
providing an aperture operably associated with the lens;
wherein at least one of first outer lens surface and the second outer lens surface is defined by a seamless profile comprising a plurality of adjoining concave and convex segments having sag perturbations disposed therealong, the seamless profile and sag perturbations being configured to at least one of reduce spatial aliasing and increase spherical aberration in an image produced by the lens along a focal plane associated therewith so as to pass predetermined lower spatial frequencies and reject predetermined higher spatial frequencies, the lens, the first and second outer lens surfaces and the aperture having an optical axis associated therewith, each of the plurality of adjoining segments being defined by a cubic polynomial function unique thereto and being rotationally symmetric in respect of the optical axis, the first and second outer lens surfaces being symmetric about the optical axis, the sag perturbations being configured to provide a controlled amount of spherical aberration such that the amount of spherical aberration provided by the lens is substantially independent of changes in the aperture.

11. The method of claim 10, further comprising over-correcting spherical aberration in an image produced by the lens.

12. The method of claim 10, further comprising under-correcting spherical aberration in an image produced by the lens.

13. The method of claim 10, further comprising providing first portions of the lens to over-correct for spherical aberration and providing second portions of the lens to under-correct for spherical aberration.

* * * * *